Dec. 18, 1962 H. J. HILL 3,068,922
LOCKING SCREWDRIVER
Filed Aug. 17, 1959 2 Sheets-Sheet 1
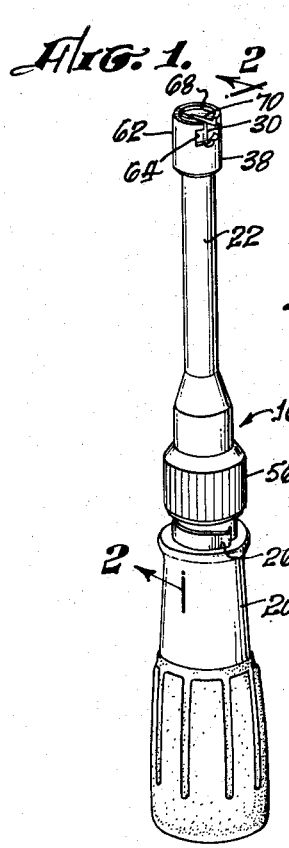
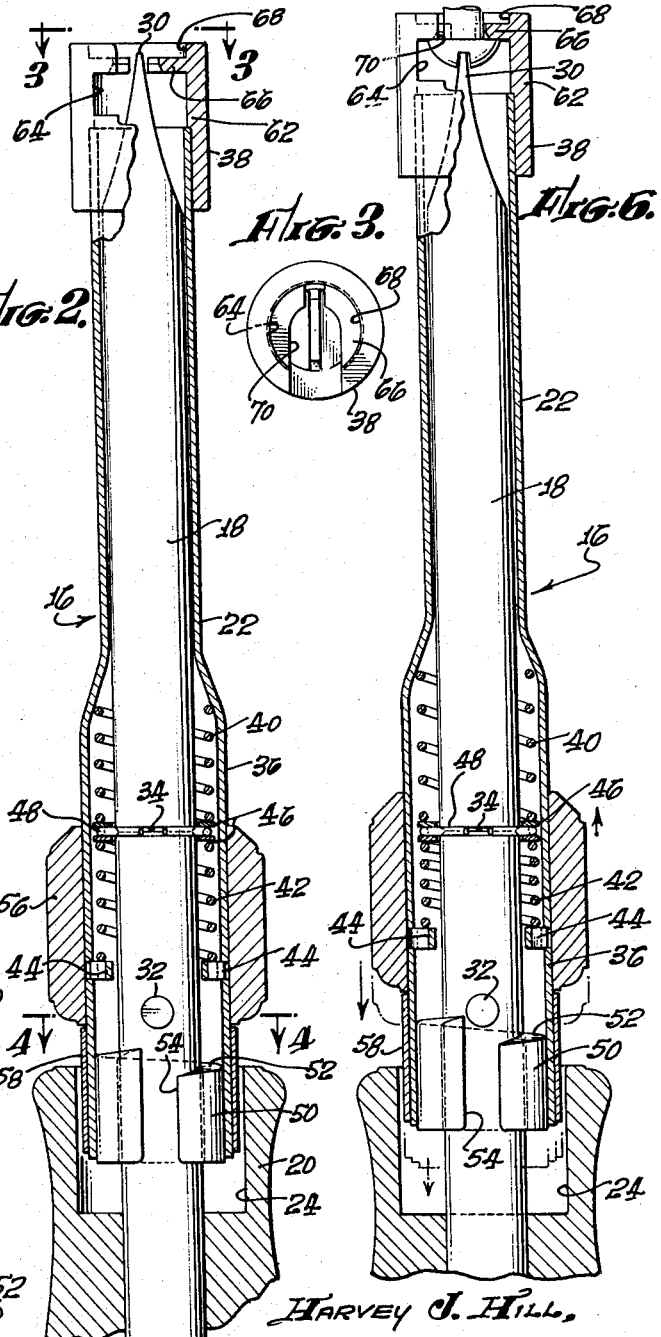
HARVEY J. HILL,
INVENTOR.
BY HIS ATTORNEYS.
HARRIS, KIECH, RUSSELL & KERN.

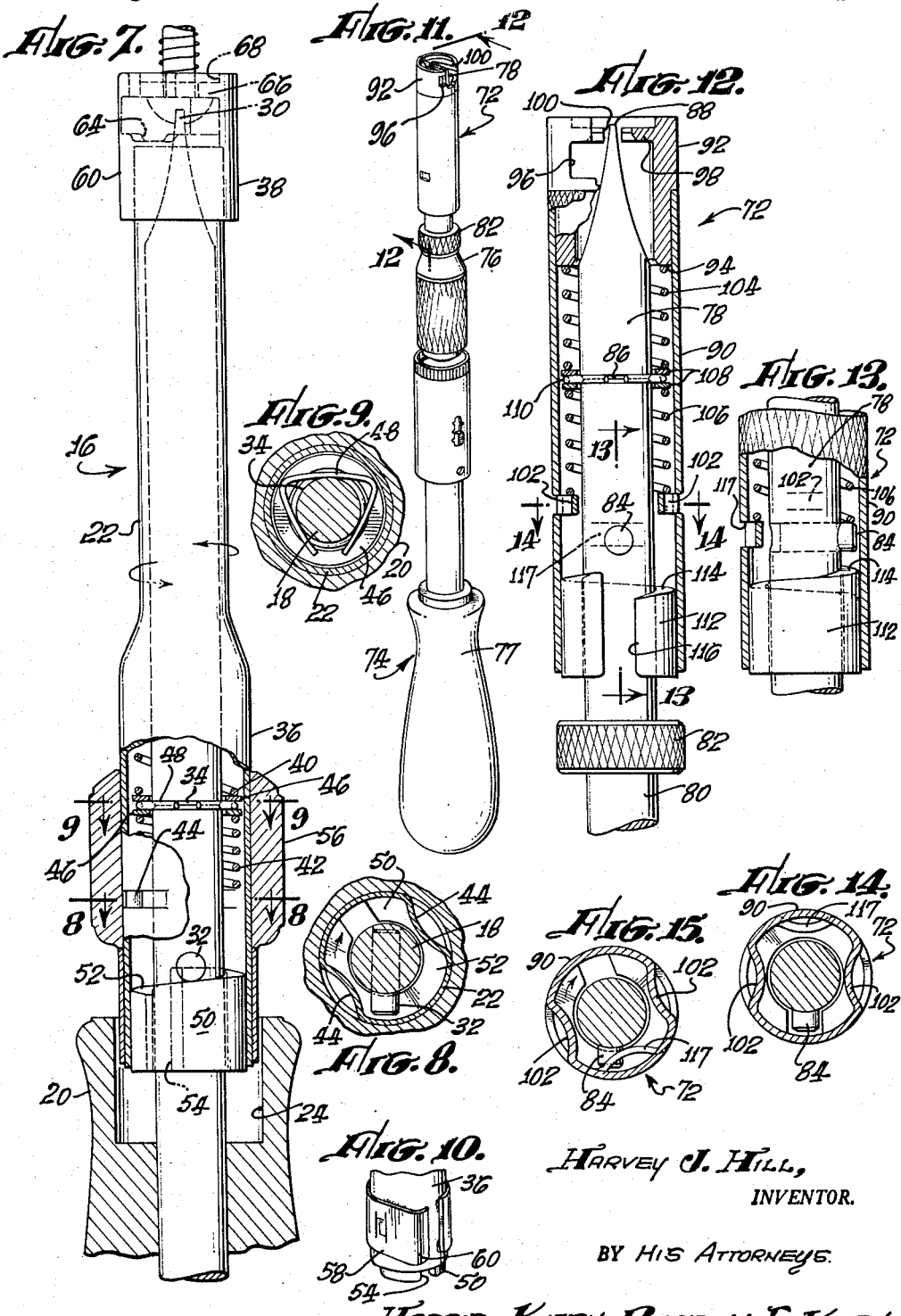

United States Patent Office

3,068,922
Patented Dec. 18, 1962

3,068,922
LOCKING SCREWDRIVER
Harvey J. Hill, Monterey Park, Calif., assignor to The Roberts Co., a corporation of California
Filed Aug. 17, 1959, Ser. No. 834,349
5 Claims. (Cl. 145—52)

The present invention relates generally to the hand tool art, and more particularly to a novel locking screwdriver.

Briefly stated, the invention comprises a locking screwdriver which includes a shaft having a tip at one end and a handle at the other end thereof, and a sleeve removably positioned on the shaft, the sleeve being rotatable relative thereto between a holding position and a locking position. The sleeve contains a chuck head at the outer end thereof for co-operation with the tip to hold the head of a fastener therebetween. Spring means are provided between the shaft and the sleeve to normally maintain the sleeve in a "floating" position with the tip of the shaft adjacent the chuck head, the sleeve being moved against the action of the spring in order to position a fastener in the chuck head in holding position. Cam means are also provided between the two members for driving the sleeve axially of the shaft to a locking position when the sleeve is rotated relative to the shaft, said cam means including a cam pin on one member and a cam with a slot therethrough on the other member, whereby the members can be assembled or separated by a straight axial push or pull movement. Friction means are provided between the shaft and the sleeve for releasably maintaining them in rotated position away from the holding position.

There are many different types of locking screwdrivers in use at the present time and most of them are deficient in one respect or another. Thus, with some, it is difficult to position the screw head in the chuck prior to the tightening or locking operation; with others, the chuck head has a tendency to inadvertently become disengaged when the user's hand is shifted in the reverse direction prior to additional rotational driving movement. In other constructions, the sleeve has a tendency to become wedged on the shaft due to the slope of the cam, and, with some constructions, the sleeve has a tendency to pop off of the shaft after the blade tip or cam surface has become worn.

It is an object of the present invention, therefore, to provide a novel locking screwdriver in which the head of a screw or the like can be easily and quickly positioned in holding engagement in the chuck prior to the locking operation. More particularly, it is an object to provide such a device in which the tip of the screwdriver shaft is spring-biased to securely maintain the head of the screw in the chuck prior to the tightening or locking operation.

Another object is to provide a novel locking screwdriver in which a screw or the like can be supported in the chuck in a holding position, as differentiated from a locking position, whereby it can be driven into an object even when the screw is disposed at an angle to the screwdriver shaft. More particularly, it is an object to provide such a device in which the head of a screw can be held loosely, yet securely, whereby the screw is free to pivot relative to the chuck without becoming disengaged from the tip of the screwdriver shaft.

Yet another object is to provide a locking screwdriver in which the tip of the screwdriver shaft is maintained in alignment with the head flange slot in the chuck when in the disengaged position so that upon the chuck being disengaged from the head of the screw, the tip of the shaft extends through the slot whereby it can be easily and quickly re-engaged with the screw head in order to drive the screw into full holding position.

A further object is to provide a locking screwdriver which includes means for obviating the inadvertent unlocking of the chuck as when the user shifts his grip on the handle in the counterclockwise direction immediately prior to a further driving stroke. More particularly, it is an object to provide such a device which includes yieldable friction means for maintaining the chuck in locked position.

Another object is to provide a locking screwdriver in which the screwdriver shaft can be easily and quickly removed from the chuck sleeve for use as a conventional screwdriver. More particularly, it is an object to provide such a device in which the screwdriver shaft can be removed from or inserted into the chuck sleeve by a simple axial push or pull movement.

Another object is to provide a locking screwdriver attachment for use with a replacement bit or ratchet type screwdriver. More particularly, it is an object to provide such an attachment which includes means for supporting a screw in fully locked or floating holding position, and which includes a replaceable screwdriver bit and a removable chuck sleeve, whereby the sleeve can be easily and quickly removed from the bit so that the latter can be used as a conventional screwdriver.

Further objects and advantages of the present invention will be apparent from the following detailed description, reference being had to the accompanying drawings wherein a preferred embodiment of the present invention is shown.

In the drawings:

FIG. 1 is a perspective view of a locking screwdriver constructed in accordance with the teachings of the present invention;

FIG. 2 is an enlarged fragmentary vertical sectional view taken on the line 2—2 in FIG. 1, showing the screwdriver in the inoperative or "floating" position;

FIG. 3 is a top plan view of the device taken on the line 3—3 in FIG. 2;

FIG. 4 is a horizontal sectional view taken on the line 4—4 in FIG. 2, showing the leaf spring in the released or unlocked position;

FIG. 5 is a horizontal sectional view similar to FIG. 4, showing the leaf spring in the locked or operative position;

FIG. 6 is a fragmentary elevational view similar to FIG. 2, showing a screw in the chuck in the holding position, prior to the sleeve being rotated to the locking position;

FIG. 7 is a fragmentary elevational view, partially in section, similar to FIG. 6 but with the sleeve rotated to the locking position;

FIG. 8 is a horizontal sectional view taken on the line 8—8 in FIG. 7;

FIG. 9 is a horizontal sectional view taken on the line 9—9 in FIG. 7;

FIG. 10 is a fragmentary perspective view of the lower end of the sleeve showing the leaf spring construction;

FIG. 11 is a perspective view of a ratchet type screwdriver provided with a locking screwdriver attachment constructed in accordance with the teachings of the present invention.

FIG. 12 is an enlarged fragmentary vertical sectional view taken on the line 12—12 in FIG. 11;

FIG. 13 is a fragmentary vertical sectional view taken on the line 13—13 in FIG. 12;

FIG. 14 is a horizontal sectional view taken on the line 14—14 in FIG. 12, showing the cam pin in the inoperative or floating position; and FIG. 15 is a horizontal sectional view similar to FIG. 14 but with the sleeve rotated so as to place the cam pin in the operative or locking position.

Referring to the drawings more particularly by reference numerals, 16 indicates a locking screwdriver embodying the teachings of the present invention, which includes a screwdriver shaft 18 fixedly supported in a handle 20, and a sleeve 22 which is removably positioned on the shaft 18 for rotational movement relative thereto. As shown in FIGS. 2, 4 and 5, the handle 20 contains a cylindrical recess 24 at the inner end thereof, concentric with the shaft 18, and which has a vertically extending groove 26 providing a shoulder 28 for a purpose to appear.

The shaft 18 has a conventional wedge-like tip 30 at the free end thereof (although other types of tips may be used), and a cam pin 32 extends laterally from the shaft 18 a short distance above the inner end of the handle 20. Formed in the shaft 18 above the cam pin 32 is an annular groove 34 which aids in maintaining the sleeve 22 in position, as will be described more fully hereinafter.

Turning to a consideration of the sleeve 22 (FIG. 2), it is of tubular construction and includes an enlarged portion 36 at the inner end thereof, and a chuck head 38 which is fastened to or formed integral with the outer end. As shown in FIG. 2, the enlarged portion 36 houses two coiled springs 40 and 42 which are maintained in position by indentations 44 and the reduced diameter at the upper end of the enlarged portion. Positioned between the adjacent ends of the coiled springs 40 and 42 are washers 46 and a U-shaped spring clip 48 (FIG. 9), which is of a size to fit in the annular groove 34 (FIG. 2).

Fastened inside the enlarged portion 36 adjacent the inner end thereof is a cam member 50 which contains a circumferentially extending cam surface 52 and an axial slot 54, the slot being of a size to freely receive the cam pin 32 (FIG. 4). A knurled or grooved annular member 56 is fastened about the enlarged portion 36 upwardly from the end thereof to aid in rotating the sleeve 22 relative to the shaft 18, as will appear more fully hereinafter. Also fastened to the outer surface of the enlarged portion adjacent the lower end thereof, is a leaf spring 58 (FIG. 10) which has a free end 60 which extends outwardly at an angle from the outer surface of the sleeve. As shown in FIG. 4, in the disengaged or inoperative position, the free end 60 is positioned in the groove 26.

Considering the upper end of the sleeve 22 and the chuck head 38, the latter includes a side cylindrical wall 62 which contains an aperture 64 of inverted T-shape. Also included in the chuck head is a transversely extending wall or flange 66 which is spaced inwardly from the outer end of the chuck head to provide a recess 68, the flange containing a bottle-shaped slot 70 (FIG. 3) for receiving the body of a fastener and the tip 30 of the screwdriver shaft.

As will be noted in FIG. 2, the tip 30 of the screwdriver shaft is in alignment with the cam pin 32 and the slot 54 in the cam is in alignment with the slot 70 in the chuck head whereby when the shaft 18 is inserted into the sleeve 22 as by passing the pin 32 through the slot 54, the tip 30 is in alignment with the slot 70. Obviously, if the tip 30 were to be positioned 90° from the pin 32 and the chuck head 38 were to be rotated a like amount on the sleeve 22, the same advantages would result. Also, by reason of the length of the springs 40 and 42 and the position of the groove 34, the tip 30 extends through the slot 70 when the device is in the inoperative or "floating" position. Thus, the tip 30 is in a position to engage the slot in the head of a screw or the like in a conventional manner.

As shown in FIG. 2 the tip 30 extends only slightly through the slot 70 and not far enough to extend all the way to the bottom of the slot in a screw head positioned in the recess 68. Consequently, when the shaft 18 is moved forward relative to the sleeve so as to seat the tip in the bottom of the screw slot, the spring 42 is compressed so as to hold the screw head in the recess 68 and thereby prevent the tip 30 from sliding sideways out of the screw slot.

It will also be apparent that by maintaining the tip 30 in the slot 70 and the free end 60 of the leaf spring in the groove 26, the cam pin 32 is maintained in alignment with the groove 54 in the cam member, whereby the sleeve 22 can be easily and quickly disengaged from the shaft 18 by a straight line axial movement.

To use the chuck portion of the device for holding a screw, for example, the handle 24 is held in one hand with the thumb and first finger in engagement with the annular member 56, and the sleeve 22 moved in the axial direction away from the handle 20 so as to compress the spring 42 and bring the tip 30 below the wall or flange 66. This permits the other hand to be free to insert the screw head through the aperture 64 in the chuck head and into the slot 70. When the sleeve 22 is released, the action of the spring 42 brings the tip into engagement with the screw head and holds it securely in position against the inner surface of the wall 66 (FIG. 6). This is the holding position. In this position, the screw may be turned by means of the shaft 18, but because the screw is held in position only by the compressed spring 42, the screw is free to pivot relative to the tip 30 and the chuck head 38. Consequently, with this arrangement, the screw can be driven into an object with the shaft 18 at an angle to the screw, as may occur when the screw is partially behind an obstruction.

To lock the screw in the chuck head 38, the sleeve 22 is rotated in the clockwise direction (looking down on the tip 30) relative to the shaft 18 (FIG. 7) so as to cause the cam pin 32 to engage the cam surface 52. This causes the sleeve 22 to be locked in position relative to the shaft 18 so as to prevent the tip 30 from moving away from the wall 66 and releasing the screw. At the same time, the leaf spring 58 rotates with the sleeve 22 within the recess 24 and the free end 60 thereof leaves the slot 26 (FIG. 4) and bears against the inner surface of the recess 24 (FIG. 5). This is a very important element in the instant construction because it releasably maintains the sleeve 22 in its rotated position away from the inoperative position, and prevents the chuck head from being inadvertently disengaged, as often occurs with known locking screwdrivers when the user shifts his hand on the handle 20 preparatory to a further driving stroke. This frictional retaining construction permits the use of a cam with a steeper slope so that less rotational movement is required to move to the locking position, and in like manner, provides for the accommodation of a relatively large range of screw sizes and screw slot tolerances. It also provides a reserve amount of axial travel which allows for resharpening of the tip. A steep slope also insures ease of release (avoids self-locking) and there is less chance of damaging the cam surface as by jamming the cam pin into it. A further advantage of the leaf spring is that if the sleeve 22 were rotated 180° without a screw in the chuck so as to bring the tip 30 into alignment with the slot 70, the frictional drag of the spring 58 within the recess 24 would prevent the sleeve from springing back into position due to the action of the spring 42 so as to "index" 180° out of normal position.

After the screw has been driven into the member to a point where the outer end of the chuck head approaches the member, the sleeve 22 is rotated in the counter-clockwise direction relative to the shaft 18, against the holding action of the leaf spring 58, until the pin 32 engages the wall of the slot 54. The cam pin 32 then being in alignment with the slot 54 and the tip 30 being in alignment with the aperture 64, the sleeve and the chuck head can be moved away from the tip to permit the screw to be easily and quickly slipped from between the flange 66 and the tip 30 by a simple sideways movement. Thereafter, the spring 42 urges the tip 30 through the slot 70 so that the tip can be re-engaged with the head of the screw to drive it all of the way into the member, as previously described.

As shown in FIGS. 11 through 15, the teachings of the present invention can also be applied to an attachment 72 for use with a ratchet type screwdriver 74 which includes a conventional chuck assembly 76 supported in a handle 77.

The attachment 72 includes a screwdriver shaft 78 which has an inner end portion 80 which is adapted to be received in the chuck assembly 76 and a knurled annular member 82 which is gripped with the thumb and forefinger of one hand when positioning said shaft within the chuck assembly. The main portion of the shaft 78 contains a transversely extending cam pin 84 and an annular groove 86, and the upper end thereof is provided with a conventional wedge-shaped tip 88.

Removably mounted on the shaft 78 is a sleeve 90 which is of tubular construction and which has a chuck head 92 fastened to the upper end thereof. The chuck head includes a bottom shoulder 94, a slot 96 of inverted T-shape in the side wall thereof, and a transversely extending wall or flange 98 which contains a bottle-shaped slot 100.

The sleeve 90 is provided with lanced indentations 102 and positioned within the sleeve between said indentations and the shoulder 94 are two axially aligned coiled springs 104 and 106. The adjacent ends of said springs engage two washers 108 which support a U-shaped spring clip 110 therebetween, the clip 110 being in releasable holding engagement with the groove 86 when the shaft 78 and sleeve 90 are in the assembled position. Mounted in the lower end of the sleeve 90 is a cam member 112 which includes a circumferentially extending cam face 114 and an axially extending slot 116. As shown in FIG. 13, the sleeve 90 contains a third lanced indentation 117 which is approximately 180° from the cam pin 84 when the shaft 78 is in the normal inoperative position, and which extends inwardly a sufficient distance to contact the end of the pin 84 when the latter is rotated adjacent to it. Thus, if the shaft 78 were rotated 180° relative to the sleeve 90 without a screw in the chuck so that the tip 88 would be in alignment with the slot 100 (but the pin would not be in alignment with the slot 116), the pin would engage the indentation 117 and prevent the spring 106 from "indexing" the tip 88 in the slot 100, 180° out of normal position.

It will be readily apparent that the attachment 72 contains all of the novel features previously described with respect to the screwdriver 16, with the exception of the leaf spring 58 which prevents inadvertent unlocking of the device, and this feature is not necessary in an attachment for use with a ratchet-type screwdriver because the ratchet action obviates the reverse rotation of the shaft relative to the sleeve with an accompanying unlocking of the chuck. Thus, it has the same "floating" action, ease of use, and other advantages described hereinabove with respect to the first construction.

It is to be understood that the foregoing description and the accompanying drawings have been given only by way of illustration and example, and that changes and alterations in the present disclosure which will be readily apparent to one skilled in the art are contemplated as within the scope of the present invention which is limited only by the claims which follow.

I claim:
1. A locking screwdriver for use with a screw type fastener, comprising: a shaft having a tip for engaging the fastener; a tubular sleeve positioned about the shaft and having a chuck head at the outer end thereof for receiving the fastener; cam means interconnecting the shaft and the sleeve for moving the shaft axially of the sleeve; and spring means having opposed ends positioned about the shaft within the sleeve, the ends of the spring means being in holding engagement with the sleeve and the spring means being in removable engagement with the shaft intermediate the ends thereof whereby the sleeve can be removed from the shaft upon disengaging the spring means therefrom.

2. A locking screwdriver for use with a screw type fastener, comprising: a screwdriver shaft containing an annular groove; a tubular sleeve positioned about the shaft and having a chuck head at the outer end thereof for receiving a fastener; cam means interconnecting the shaft and the sleeve for moving the shaft axially of the sleeve; opposed spaced shoulder means in the sleeve on both sides of the annular groove; two coiled springs in axial alignment positioned about the shaft within the sleeve, said springs having inner ends and outer ends, the outer ends being in engagement with the shoulders; and expandable clip means positioned between the inner ends of the springs in removable holding engagement with the annular groove in the shaft.

3. A locking screwdriver for use with a screw type fastener, comprising: a shaft having a tip at one end and a handle at the other end thereof; a tubular sleeve positioned about the shaft and having an outer end adjacent the tip and an inner end adjacent the handle; a chuck head at the outer end of the sleeve for receiving a fastener; cam means between the shaft and the sleeve for moving the sleeve axially of the shaft when the sleeve is rotated relative thereto between a holding position and a locking position; a cylindrical recess in the handle about the shaft, the inner end of the sleeve extending into said recess; an axially extending groove in the wall of the recess; and a leaf spring having a free end carried by the sleeve, the free end of the spring being loosely positioned in said groove in the holding position and being in frictional engagement with the wall of the recess when the sleeve is in rotated position away from the holding position.

4. A locking screwdriver for use with a screw type fastener, comprising: a shaft having a tip at one end and a handle at the other end thereof; a cam pin extending from the shaft adjacent the handle; a tubular sleeve positioned about the shaft and having an inner end and an outer end, the sleeve being rotatable relative to the shaft between a holding position and a locking position; a chuck head at the outer end of the sleeve for receiving a fastener in co-operation with said tip; a cylindrical cam fastened within the sleeve adjacent the inner end thereof, said cam containing a cam face and an axially extending slot, the slot being of a size to permit the passage of the cam pin; means releasably maintaining the sleeve on the shaft; a cylindrical recess in the handle about the shaft for receiving the inner end of the sleeve; an axially extending groove in the recess; and a leaf spring fastened about the inner end of the sleeve and containing a free end which is positioned in the groove when the sleeve is in the holding position, said free end engaging the wall of the recess for releasably maintaining the sleeve in rotated position away from said holding position, the cam pin being in alignment with the slot in the cam when the sleeve is in the holding position.

5. A locking screwdriver attachment for use with a handle member containing a chuck, comprising: a shaft adapted to be received in the chuck and having a tip at the outer end thereof; a sleeve positioned about the shaft and having an inner end and an outer end; a chuck head mounted on the outer end of the sleeve and providing a shoulder within the sleeve; a series of indentations in the sleeve adjacent the inner end thereof; coiled spring means disposed about the shaft within the sleeve, one end of the spring means being in engagement with the shoulder and the other end being in engagement with the indentations; means releasably interconnecting the spring means intermediate the ends thereof with the shaft; and cam means between the sleeve and the shaft for moving the sleeve axially of the shaft upon relative rotational movement therebetween.

References Cited in the file of this patent

UNITED STATES PATENTS

| | | |
|---|---|---|
| 1,539,782 | Stansell | May 26, 1925 |
| 2,796,100 | Dierker | June 18, 1957 |